US012754388B2

(12) United States Patent
Merbach et al.

(10) Patent No.: US 12,754,388 B2
(45) Date of Patent: Oct. 6, 2026

(54) HIGH DENSITY, LOW DIAMETER CABLE WITH ROLLABLE FIBER OPTIC RIBBON

(71) Applicant: CORNING RESEARCH & DEVELOPMENT CORPORATION, Corning, NY (US)

(72) Inventors: Gerhard Merbach, Neustadt bei Coburg (DE); Sebastian Olszewski, Lodz (PL)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 310 days.

(21) Appl. No.: 18/196,644

(22) Filed: May 12, 2023

(65) Prior Publication Data

US 2023/0296855 A1 Sep. 21, 2023

Related U.S. Application Data

(63) Continuation of application No. PCT/US2021/058710, filed on Nov. 10, 2021.

(60) Provisional application No. 63/115,836, filed on Nov. 19, 2020.

(51) Int. Cl.
*G02B 6/44* (2006.01)

(52) U.S. Cl.
CPC ....... *G02B 6/4432* (2013.01); *G02B 6/44384* (2023.05); *G02B 6/4486* (2013.01)

(58) Field of Classification Search
CPC .................................................... G02B 6/4403
See application file for complete search history.

(56) References Cited

U.S. PATENT DOCUMENTS

| | | | | |
|---|---|---|---|---|
| 5,050,957 A * | 9/1991 | Hamilton | G02B 6/4436 | 385/113 |
| 6,311,000 B1 | 10/2001 | Schneider | | |
| 7,050,688 B2 | 5/2006 | Lochkovic et al. | | |
| 2006/0147165 A1* | 7/2006 | Um | G02B 6/4432 | 385/100 |
| 2010/0135625 A1 | 6/2010 | Overton | | |
| 2013/0188916 A1* | 7/2013 | Bradley | G02B 6/4206 | 385/113 |

(Continued)

FOREIGN PATENT DOCUMENTS

| | | | |
|---|---|---|---|
| CN | 1163415 A * | 10/1997 | G02B 6/4432 |
| CN | 106154471 A | 11/2016 | |

(Continued)

OTHER PUBLICATIONS

International Search Report and Written Opinion of the International Searching Authority; PCT/US2021/058710; dated Feb. 17, 2022; pp. 13; International Searching Authority.

(Continued)

*Primary Examiner* — Charlie Y Peng
(74) *Attorney, Agent, or Firm* — Thomas R. Irwin

(57) ABSTRACT

A high density, low diameter optical fiber ribbon cable is provided. The cable includes a polymeric outer cable jacket and a plurality of flexible optical fiber ribbons. The cable includes a relatively high number of optical fibers despite a relatively small outer diameter. The flexible optical fiber ribbons are located within the cable jacket without buffer tubes, central strength elements and/or gel materials.

14 Claims, 2 Drawing Sheets

(56) References Cited

U.S. PATENT DOCUMENTS

| | | | | |
|---|---|---|---|---|
| 2013/0287349 | A1* | 10/2013 | Faulkner ................ | H01B 11/22 385/101 |
| 2017/0235068 | A1 | 8/2017 | Debban et al. | |
| 2018/0224619 | A1 | 8/2018 | Debban et al. | |
| 2018/0321455 | A1 | 11/2018 | Cignarale et al. | |
| 2020/0103604 | A1 | 4/2020 | Bradley | |
| 2020/0142144 | A1 | 5/2020 | Blazer et al. | |
| 2020/0174209 | A1* | 6/2020 | Weimann ............... | G02B 6/441 |
| 2020/0183118 | A1 | 6/2020 | Sahoo et al. | |
| 2020/0319419 | A1 | 10/2020 | Neveux, Jr. et al. | |

FOREIGN PATENT DOCUMENTS

| | | | | |
|---|---|---|---|---|
| CN | 107209337 | A | 9/2017 | |
| EP | 3514593 | A1 | 7/2019 | |
| WO | 2016/163190 | A1 | 10/2016 | |
| WO | WO-2017145955 | A1 * | 8/2017 | ........... G02B 6/3636 |
| WO | WO-2019010291 | A1 * | 1/2019 | ........... G02B 6/4403 |

OTHER PUBLICATIONS

Extended European Search Report, EP application No. 21895369.3, dated Sep. 25, 2024, 8 pages, European patent office.

* cited by examiner

HIGH DENSITY, LOW DIAMETER CABLE WITH ROLLABLE FIBER OPTIC RIBBON

CROSS-REFERENCE TO RELATED APPLICATIONS

This application is a continuation of International Application No. PCT/US2021/058710 filed Nov. 10, 2021, which claims the benefit of priority of U.S. Provisional Application Ser. No. 63/115,836 filed on Nov. 19, 2020, the content of which is relied upon and incorporated herein by reference in its entirety.

BACKGROUND

The disclosure relates generally to optical fiber cables. The disclosure relates specifically to densely packed, low diameter cables utilizing rollable fiber optic ribbons. Optical cables have seen increased use in a wide variety of fields including various electronics and telecommunications fields. Optical cables contain or surround one or more optical fibers. The cable provides structure and protection for the optical fibers within the cable.

SUMMARY

One embodiment of the disclosure relates to a high density, low diameter optical fiber ribbon cable including a polymeric outer cable jacket. The polymeric outer cable jacket includes an inner surface defining an interior cavity, an exterior surface defining an outermost surface of the cable and a maximum outer dimension of 4 mm to 6 mm. The cable includes a plurality of optical fiber ribbons surrounded by the polymeric outer cable jacket. Each of the optical fiber ribbons includes a plurality of optical fibers coupled together via a ribbon body, and the ribbon body is formed from a flexible material such that the each of the plurality of optical fiber ribbons are reversibly movable from an unrolled position to a rolled position. The cable includes a non-gel, non-liquid water blocking material located within the interior cavity. A number of the plurality of optical fiber ribbons is 2 to 16. A total number of optical fibers of all of the plurality of optical fiber ribbons is 16 to 256, and the interior cavity is free from a gel material.

An additional embodiment of the disclosure relates to an optical cable including a polymeric outer cable jacket. The polymeric outer cable jacket includes an inner surface defining an interior cavity, an exterior surface defining an outermost surface of the cable and a maximum outer dimension less than 6 mm. The cable includes a plurality of optical fiber ribbons surrounded by the polymeric outer cable jacket. Each of the optical fiber ribbons includes a plurality of optical fibers coupled together via a ribbon body. The ribbon body is formed from a flexible material such that the each of the plurality of optical fiber ribbons are reversibly movable from an unrolled position to a rolled position. The cable includes a non-gel, non-liquid water blocking material located within the interior cavity. A number of the plurality of optical fiber ribbons is less than 17. A central region of the interior cavity is occupied by at least one of the plurality of optical fiber ribbons.

An additional embodiment of the disclosure relates to optical cable includes a polymeric outer cable jacket. The polymeric outer cable jacket includes an inner surface defining an interior cavity and an exterior surface defining an outermost surface of the cable. The cable includes a plurality of optical fiber ribbons surrounded by the polymeric outer cable jacket, each of the optical fiber ribbons including a plurality of optical fibers coupled together via a ribbon body. The ribbon body is formed from a flexible material such that each of the plurality of optical fiber ribbons are reversibly movable from an unrolled position to a rolled position. The cable includes at least two extruded polymer anti-buckling elements bonded to, embedded in and coextruded with the polymeric outer cable jacket. The outer cable jacket includes a first polymer material, and the extruded polymer anti-buckling elements include a second polymer material. The second polymer material is more rigid than the first polymer material Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and operation of the various embodiments.

DETAILED DESCRIPTION

Referring generally to the figures, various embodiments of a high density, low diameter fiber optic cable including rollable ribbons is shown and described. In general, the fiber optic cables discussed herein utilize an innovative design that provides high fiber density, small size/diameter and various elements that provide for improved ease of installation and use. In particular the cable designs discussed herein include rollable ribbons within the cable jacket without buffer tubes. In addition, the cable design utilizes dry water blocking components rather than typical gel-filled buffer tubes to limit water penetration. These features allow for easy handling by allowing mass fusion splicing, elimination of buffer tube opening steps and elimination of fiber cleaning steps needed to remove gel from optical fibers typical with use of other small diameter cable. Applicant has found that elimination of fiber stripping and cleaning steps provided by the cable design discussed herein not only increases ease of installation but also decreases the risk of fiber damage during installation.

Further, in specific embodiments, the designs discussed herein improve manufacturing process by reducing the number of manufacturing steps. In various embodiments, cable designs discussed herein include at least two extruded, polymeric strength elements that are coextruded within and embedded in the cable jacket. This new design element and the lack of internal buffer tubes provides an optical fiber cable that is manufactured via a one-step manufacturing process that directly coextrudes strength elements within the cable jacket and that eliminates the need for a buffer tube extrusion step.

Figure 1:
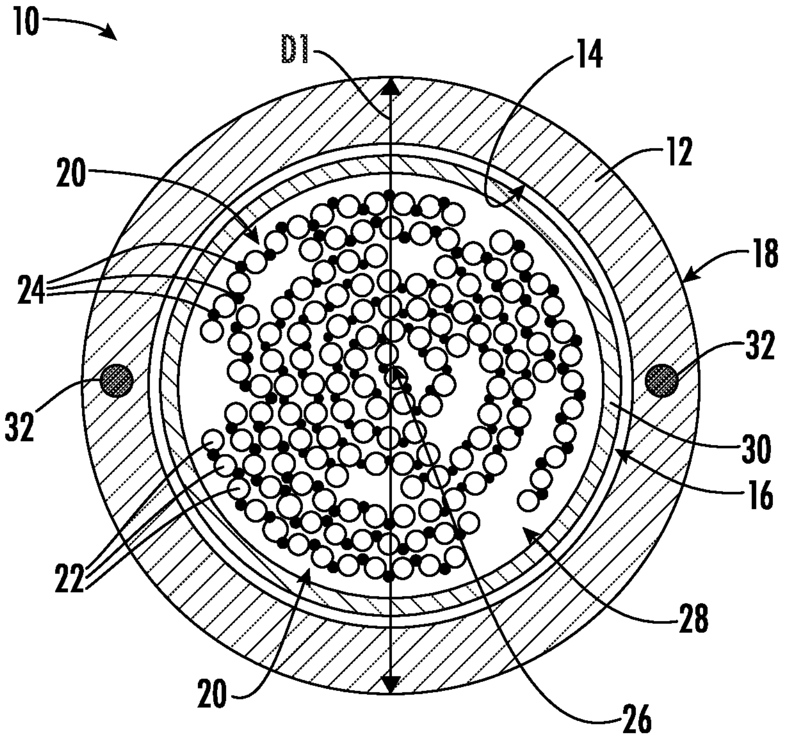
FIG. 1 is a cross-sectional view of an optical fiber cable, according to an exemplary embodiment.

Referring to FIG. 1, an optical cable, shown as a high density, low diameter optical fiber ribbon cable 10, is illustrated according to an exemplary embodiment. Cable 10 includes an outer cable jacket, shown as outer jacket 12, having an inner surface 14 that defines an inner passage or cavity, shown as central bore 16, and an outer surface 18 that generally defines the outermost surface of cable 10. In general, outer jacket 12 is formed from a polymeric material. As will be generally understood, inner surface 14 of jacket 12 defines an internal area or region within which rollable optical fiber ribbons discussed herein are located.

In various embodiments, cable jacket 12 is formed from an extruded thermoplastic material. In various embodiments, cable jacket 12 may be a variety of materials used in cable manufacturing such as polyethylene, medium density polyethylene (MDPE), high density polyethylene (HDPE), polyvinyl chloride (PVC), polyvinylidene difluoride (PVDF), nylon, polyester or polycarbonate and their copolymers. In addition, the material of cable jacket 12 may include small quantities of other materials or fillers that provide different properties to the material of cable jacket 12. For example, the material of cable jacket 12 may include materials that provide for coloring, UV/light blocking (e.g., carbon black), burn resistance, etc.

Cable 10 includes a plurality of optical fiber ribbons 20. In general, optical fiber ribbons 20 are surrounded by cable jacket 12 and are located within central bore 16 defined by inner surface 14 of cable jacket 12. As will be discussed in more detail below, optical fiber ribbons 20 each include a plurality of optical fibers 22 coupled together via a ribbon body 24. In general, ribbon body 24 is formed from a flexible material such that each of the plurality of optical fiber ribbons 20 are reversibly movable from an unrolled position to a compressed or rolled position.

As shown in FIG. 1, to pack optical fiber ribbons 20 within cable jacket 12, various ribbons 20 of cable 10 assume different shapes and/or different levels of rolling/compression with the ribbons 20 toward the central region 26 of central bore 16 forming a more compressed/rolled arrangement, and ribbons 20 adjacent jacket 12 having slightly bent shapes conforming roughly to the shape of inner surface 14. Rollable ribbons 20 provide for the handling, organizational and splicing benefits of typical linear fiber optic ribbons while providing for increased packing density due the ability of rollable ribbons 20 to bend/flex and assume compressed configurations as shown in FIG. 1. Further, rollable ribbons 20 have lower thickness ribbon bodies 24 as compared to traditional optical fiber ribbons, which further increases packing density within cable 10.

In various embodiments, cable 10 provides for relatively high numbers of optical fibers 22 and ribbons 20 within cable 10 having a relatively small outer diameter. In various embodiments, cable 10 includes less than 17 ribbons 20 and specifically has 2 and 16 ribbons 20 and between 16 and 256 total optical fibers 22. In such embodiments, cable 10 provides this number of optical fibers and ribbons within a cable having a maximum outer dimension, shown as outer diameter D1 that is relatively small, such as less than 6 mm and specifically of 4 mm to 6 mm. In more specific embodiments, cable 10 includes at least 12 ribbons 20 and at least 144 total optical fibers 22 within the relatively low outer diameter D1. In even more specific embodiments, D1 is 5 mm to 6 mm, more specifically D1 is 4.5 mm to 5.5 mm and even more specifically, D1 is 4.75 mm to 5.25 mm. In a specific embodiment, cable 10 has 12 ribbons 20 each including 12 optical fibers 22 within a cable jacket 12 having a diameter D1 of about 5 mm. In this manner, cable 10 provides a relatively high number of optical fibers 22 in a small space, which in turn allows cable 10 to be used in a wide variety of installation settings (e.g., ducts, conduits, etc.) in which space is at a premium.

In various embodiments, the high fiber density provided by cable 10 can be defined in other ways. In various embodiments, cable 10 has a fiber filling ratio (e.g., the percent of bore 16 occupied by ribbons and/or optical fibers) of between 40% and 60% and more specifically of between 50% and 60%.

In various embodiments, further facilitating the low overall outer diameter of cable 10, cable jacket 12 has a relatively low overall thickness, as measured between inner surface 14 and outer surface 18. In various embodiments, cable jacket 12 has a thickness of 0.5 mm to 0.9 mm, specifically of 0.55 mm to 0.85 mm and more specifically of about 0.6 mm to 0.8 mm.

As shown in FIG. 1, ribbons 20 of cable 10 are not located within buffer tubes within cable jacket 12. Thus, in contrast to cable designs in which groups of ribbons are located in and separated from each other via buffer tubes, all of the ribbons 20 of cable 10 are located together, unseparated within central bore 16 of cable jacket 12 forming a single group of optical fiber ribbons 20. In this arrangement, all of the ribbons 20 of cable 10 can be accessed by opening cable jacket 12 without the additional step of opening individual buffer tubes. In addition, elimination of buffer tubes within cable 10 further allows for a decrease in outer diameter while still providing relatively high fiber counts.

As noted above, in order to further facilitate ease of handling during installation, central bore 16 of cable 10 does not include a gel material, such as a thixotropic filing gel, that is commonly utilized in many cable and buffer tube designs. Thus, in such embodiments, at least some free space 28 is located within central bore 16 between ribbons 20. In some such embodiments, cable 10 includes a non-gel, non-liquid water blocking material located within the bore 16. As noted above, elimination of gel materials from cable 10 facilitates handling/installation by eliminating steps typically needed to clean gel from fibers before splicing.

For example in various embodiments, the non-gel, non-liquid water blocking material includes a water blocking tape 30 wrapped around all of the ribbons 20 of cable 10. In this arrangement, water blocking tape 30 has an outer surface that faces inner surface 14 of cable jacket 12 with no intervening cable layers (e.g., armor layers, jacket layers, binder layers, etc.). Similarly, in some embodiments, water blocking 30 has an inner surface that faces ribbons 20 with no intervening cable layers (e.g., armor layers, jacket layers, buffer tubes, binder layers, etc.). In various embodiments, cable 10 may include a water blocking powder (e.g., an SAP powder) within bore 16, instead of or in addition to water blocking tape 30.

In specific embodiments, water blocking tape 30 is a low thickness, yet highly absorbing water blocking material. In specific embodiments, water blocking tape 30 has a thickness between its inner and outer surfaces of 0.05 mm to 0.2 mm and specifically of 0.08 mm to 0.14 mm. Applicant has found that by utilizing a thin water blocking tape of this nature, the small size of cable 10 can be maintained while providing satisfactory water blocking properties.

In further contrast to many optical fiber cables, cable 10 does not include a central strength member located at center region 26 of central bore 16. Thus, in cable 10 central region 26, including the center point of bore 16, is occupied by one or more ribbon 20 instead of being occupied by a central strength element. In some such embodiments, ribbons 20 are stranded or are positioned in an oscillating arrangement that provides a position/orientation change of each ribbon 20 along the length of the cable allowing for improved bending performance. Elimination of a central strength element within cable 10 further allows for a decrease in outer diameter while allowing for an increase in fiber density by freeing up space within the cable jacket for optical fiber ribbons.

While cable 10 does not include a central strength element typical of many cable designs, in some embodiments, cable 10 is configured to provide increased anti-buckling performance. In such embodiments, cable 10 includes at least two extruded polymer strength elements 32 embedded in cable jacket 12. In contrast to typical GRP or metallic strength elements, strength elements 32 are formed from polymer material that is coextruded with the polymeric material of cable jacket 12. In this manner, strength elements 32 are bonded to, embedded within and coextruded with cable jacket 12 via a single manufacturing step. In addition, Applicant has found that embedding of standard strength elements (e.g., via extrusion of jacket material around the strength elements) is impossible or difficult to accomplish given the low thickness of cable jacket 12.

To provide cable 10 with increased anti-buckling performance, strength elements 32 are formed from a polymer material that is different from the polymer material of cable jacket 12. In various embodiments, the polymer material of strength elements 32 has a modulus of elasticity that is greater than a modulus of elasticity of the material of cable jacket 12. In a specific embodiment, the modulus of elasticity of the material of strength elements 32 is between 15,000 MPa and 20,000 MPa. In other embodiments, the polymer material of strength elements 32 has a rigidity that is greater than a rigidity of the material of cable jacket 12. In specific embodiments, strength elements 32 are formed from a coextruded liquid crystal polymer material. In other embodiment, strength elements 32 are formed from a polycarbonate material.

In addition to the practicality of being coextruded, strength elements 32 are smaller in one or more cross-sectional area than typical strength elements to accommodate the low thickness of cable jacket 12. In various embodiments, strength elements 32 have a cross-sectional area of 0.1 $mm^2$ to 0.3 $mm^2$. In various embodiments, a total cross-sectional area of the extruded polymer strength elements 32 is less than 3% of the total cross-sectional area located within outer surface 18 of the polymeric outer cable jacket.

Figure 2:
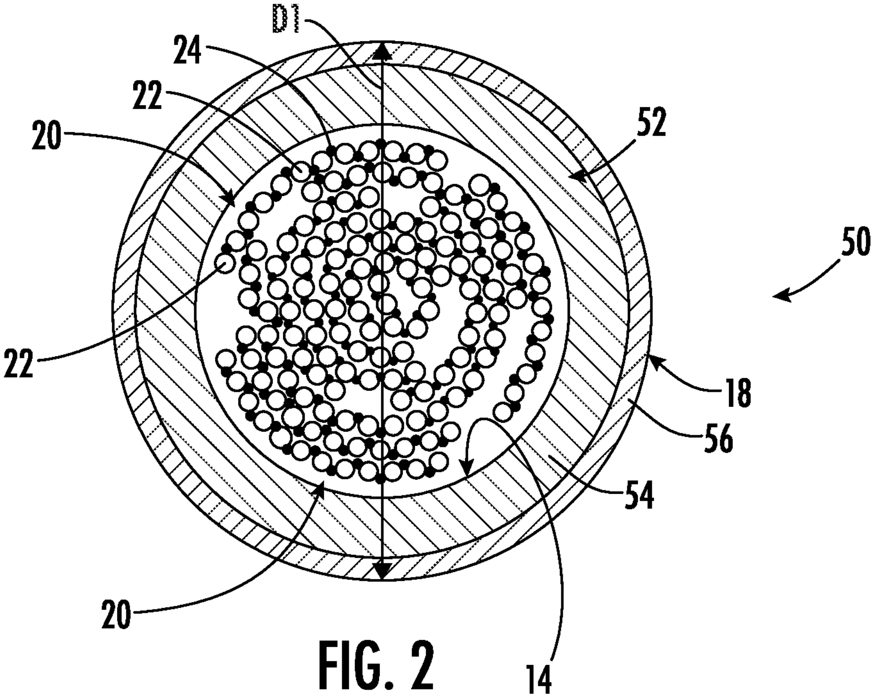
FIG. 2 is a cross-sectional view of an optical fiber cable, according to another exemplary embodiment.

Referring to FIG. 2, an optical fiber cable 50 is shown according to an exemplary embodiment. Cable 50 is substantially the same as cable 10 except as discussed herein. In general, cable 50 includes an outer jacket 52 designed for good performance during blowing installation operations and/or for low tensile load applications. Thus, to provide for good blowing performance, outer cable jacket 52 includes an inner layer 54 and an outer layer 56. Inner layer 54 defines inner surface 14 that defines central bore 16, and outer layer 56 defines outer surface 18.

As shown in FIG. 2, outer layer 56 is thinner than inner layer 54. In one embodiment, outer layer 56 is formed from a material that provides a low friction outer surface 18 to facilitate blowing installation operations. In a specific embodiment, inner layer 54 is formed from a relatively hard polycarbonate material, and outer layer 56 is formed from an HDPE material providing for relatively low friction to outer surface 18.

Figure 3:
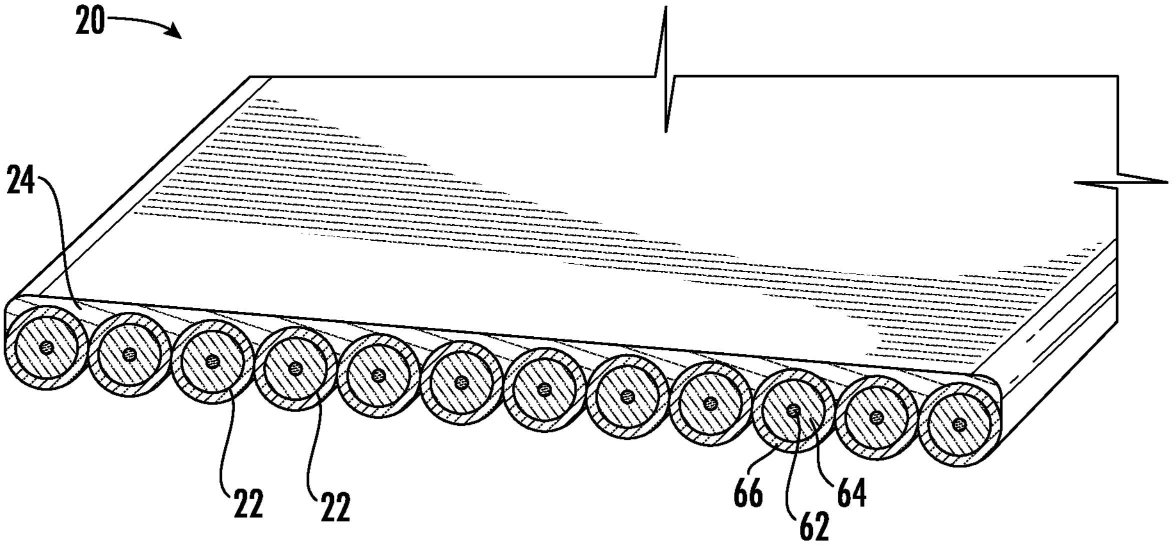
FIG. 3 is a perspective view of a rollable optical fiber ribbon, according to an exemplary embodiment.
Figure 4:
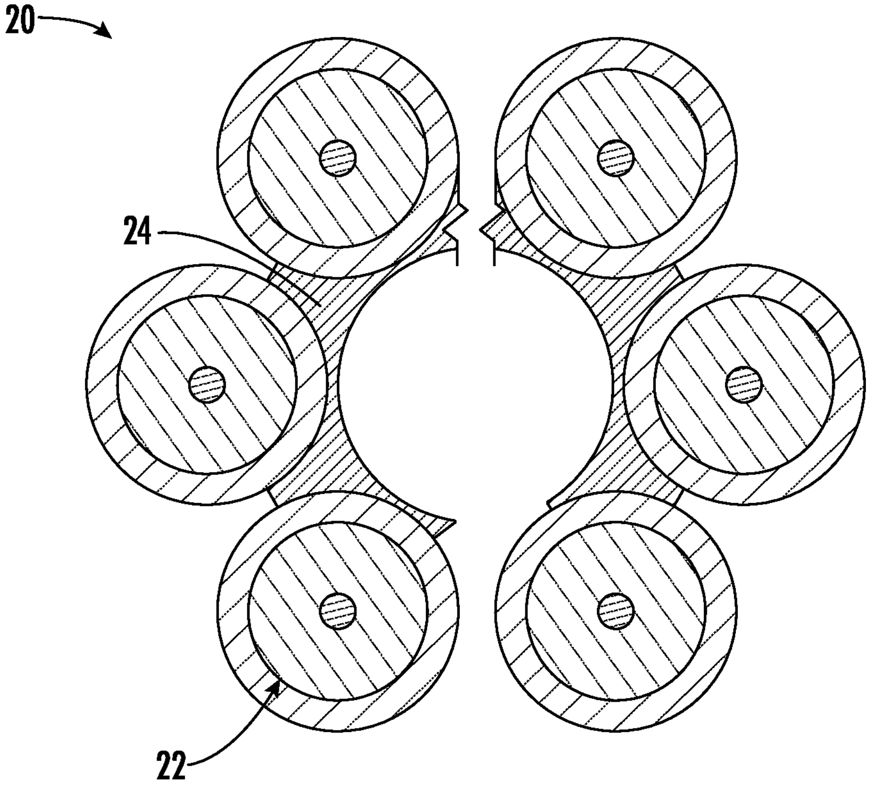
FIG. 4 is a cross-sectional view of the optical fiber ribbon of FIG. 3 in a rolled, curved or compressed position, according to an exemplary embodiment.

As discussed above, cable 10 and cable 50 utilize flexible or rollable ribbons 20 that include ribbon bodies 24 that allow for rolling, flexing, compression, etc. as shown in FIGS. 1 and 2. Referring to FIGS. 3 and 4, various details of designs for rollable ribbons 20 are shown and described. In general, ribbons 20 are configured to allow the ribbon to be bent, curved or rolled from an unrolled position to a compressed, rolled or curved position. In such embodiments, optical fibers 22 are coupled to and supported by a ribbon body 24. Ribbon body 24 is formed from a material that is configured to allow the ribbon to be rolled and unrolled as needed.

In various embodiments, ribbons 20 utilize a ribbon body 24 that completely or partially surrounds the optical fibers 22 when viewed in longitudinal cross-section. Generally, ribbon body 24 is formed from a material, such as a polymer material, that has an elasticity and/or thickness that allows for the rollability of the ribbon. In some embodiments, ribbon body 24 may be formed from a plurality of discreet sections or bridges spaced along the longitudinal axis of adjacent optical fibers 22, as shown in FIGS. 1 and 2. In other various embodiments, the ribbon body is contiguous, lengthwise and/or widthwise, over the optical fibers, but flexible enough to provide for the flexibility discussed herein.

Referring to FIGS. 3 and 4, detailed views of an optical fiber ribbon 20 is shown according to an exemplary embodiment. Ribbon 20 includes a ribbon body 24 and a plurality of optical fibers 22. Optical fibers 22 are coupled to and supported by the material of ribbon body 24. In FIG. 3, ribbon 20 is shown in an unrolled or aligned position, and in this position, optical fibers 22 are generally arranged in a parallel arrangement of optical fibers in which the central axes of each fiber (i.e., the axis of each optical fiber 22 perpendicular to the cross-section shown in FIGS. 3 and 4) are substantially parallel to each other. Ribbon body 24 is configured in various ways to allow ribbon 20 to be reversibly moved from an unrolled or aligned position shown in FIG. 3 to a compressed, curved or rolled position shown in FIG. 4, while still providing sufficient support and structure for fibers 22.

To move from the unrolled position of FIG. 3 to the rolled position shown in FIG. 4, ribbon body 24 is bent or curved, allowing ribbon 20 to assume a nonaligned position. In general, ribbons 20 may be in a rolled, bent or compressed configuration within the cable (e.g., cable 10 or 50), and then during installation, an end of ribbon 20 may be accessed through cable jacket 12, returned to the unrolled/aligned position to be coupled to an optical connector, such as via use of mass splicing equipment.

In the embodiment shown, each optical fiber 22 includes an optically transmitting optical core 62 and a cladding layer 64. Optical fibers 22 also each include a coating layer 66. Coating layer 66 surrounds both optical core 62 and cladding layer 64. In the embodiment shown, coating layer 66 is a single layer formed from a material that provides protection (e.g., protection from scratches, chips, etc.) to optical fibers 22. In various embodiments, coating layer 66 may be a UV curable acrylate material. In the embodiment shown, an inner surface of ribbon body 24 is bonded, adhered or coupled to an outer surface of coating layer 66 of each optical fiber 22. In some embodiments, ribbon 20 has at least two optical fibers 22. In some other embodiments, ribbon 20 has at least four optical fibers 22. In still other embodiments, ribbon 20 has at least eight optical fibers 22. In yet still other embodiments, ribbon 20 has at least 12 optical fibers 22.

In various embodiments, ribbon bodies 24 discussed herein may be formed by applying a polymer material, such as a UV curable polymer material, around optical fibers 22 in the desired arrangement to form a particular ribbon body. The polymer material is then cured forming the integral, contiguous ribbon body while also coupling the ribbon body to the optical fibers. In other embodiments, the ribbon bodies discussed herein may be formed from any suitable polymer material, including thermoplastic materials and thermoset materials. In a specific embodiment, ribbon bodies 24 are formed from a material that is temperature stable such that the ribbon bodies exhibit low or no tackiness following extrusion.

In various embodiments, optical fibers 22 discussed herein include optical fibers that are flexible, transparent optical fibers made of glass. The fibers function as a wave-guide to transmit light between the two ends of the optical fiber. Optical fibers include a transparent glass core surrounded by a transparent cladding material with a lower index of refraction. Light is kept in the core by total internal reflection. Glass optical fibers may include silica, but some other materials such as fluorozirconate, fluoroaluminate and chalcogenide glasses, as well as crystalline materials such as sapphire, may be used. The light is guided down the core of the optical fibers by an optical cladding with a lower refractive index that traps light in the core through total internal reflection. The cladding may be coated by a buffer and/or another coating(s) that protects it from moisture and/or physical damage. These coatings may be UV-cured urethane acrylate composite materials applied to the outside of the optical fiber during the drawing process. The coatings may protect the strands of glass fiber. In various embodiments, the optical fibers may be bend insensitive optical fibers or multi-core optical fibers.

It is to be understood that the foregoing description is exemplary only and is intended to provide an overview for the understanding of the nature and character of the fibers which are defined by the claims. The accompanying drawings are included to provide a further understanding of the embodiments and are incorporated and constitute part of this specification. The drawings illustrate various features and embodiments which, together with their description, serve to explain the principals and operation. It will become apparent to those skilled in the art that various modifications to the embodiments as described herein can be made without departing from the spirit or scope of the appended claims.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A high density, low diameter optical fiber ribbon cable comprising:
- a polymeric outer cable jacket comprising:
  - an inner surface defining an interior cavity;
  - an exterior surface defining an outermost surface of the cable; and
  - a maximum outer dimension of 4 mm to 6 mm;
- at least one extruded polymer anti-buckling element bonded to, embedded within and coextruded with the polymeric outer cable jacket;
- a plurality of optical fiber ribbons surrounded by the polymeric outer cable jacket, each of the optical fiber ribbons comprising a plurality of optical fibers coupled together via a ribbon body, wherein the ribbon body is formed from a flexible material such that the each of the plurality of optical fiber ribbons are reversibly movable from an unrolled position to a rolled position;
- a non-gel, non-liquid water blocking material located within the interior cavity;
- wherein a number of the plurality of optical fiber ribbons is 2 to 16;
- wherein a total number of optical fibers of all of the plurality of optical fiber ribbons is at least 144;
- wherein the interior cavity is free from a gel material; and
- wherein the polymeric outer cable jacket has a thickness of 0.5 mm to 0.9 mm.

2. The high density, low diameter optical fiber ribbon cable of claim 1, wherein the plurality of optical fiber ribbons are not located within buffer tubes such that all of the plurality of optical fiber ribbons form a single group within the outer cable jacket, wherein the number of the plurality of optical fiber ribbons is at least 12.

3. The high density, low diameter optical fiber ribbon cable of claim 2, wherein the maximum outer dimension is 5 mm to 6 mm.

4. The high density, low diameter optical fiber ribbon cable of claim 3, wherein a central region of the interior cavity is occupied by at least one of the plurality of optical fiber ribbons.

5. The high density, low diameter optical fiber ribbon cable of claim 4, wherein the plurality of optical fiber ribbons are unbuffered such that all of the plurality of optical fiber ribbons are not separated from each other within the outer cable jacket.

6. The high density, low diameter optical fiber ribbon cable of claim 1, wherein the non-gel, non-liquid water blocking material is at least one of a water blocking tape wrapped around all of the plurality of optical fiber ribbons and a water blocking powder.

7. The high density, low diameter optical fiber ribbon cable of claim 1, wherein the outer cable jacket comprises a first polymer material and the at least one extruded polymer anti-buckling elements comprises a second polymer material, wherein a modulus of elasticity of the second polymer material is greater than a modulus of elasticity of the first polymer material.

8. The high density, low diameter optical fiber ribbon cable of claim 1, wherein a total cross-sectional area of the extruded polymer anti-buckling elements is less than 3% of the total cross-sectional area located within the exterior surface of the polymeric outer cable jacket.

9. The high density, low diameter optical fiber ribbon cable of claim 1, wherein a fiber filling ratio within the interior cavity is 40% to 60%.

10. An optical cable comprising:

a polymeric outer cable jacket comprising:

an inner surface defining an interior cavity; and an exterior surface defining an outermost surface of the cable, wherein a maximum outer dimension of the cable jacket is less than 6 mm;

at least two extruded polymer anti-buckling elements bonded to, embedded in and coextruded with the polymeric outer cable jacket, a plurality of optical fiber ribbons surrounded by the polymeric outer cable jacket, each of the optical fiber ribbons comprising a plurality of optical fibers coupled together via a ribbon body, wherein the ribbon body is formed from a flexible material such that the each of the plurality of optical fiber ribbons are reversibly movable from an unrolled position to a rolled position; and a non-gel, non-liquid water blocking material located within the interior cavity;

wherein a number of the plurality of optical fiber ribbons is less than 17;

wherein a central region of the interior cavity is occupied by at least one of the plurality of optical fiber ribbons;

wherein a total number of optical fibers of all of the plurality of optical fiber ribbons is at least 144; and wherein the polymeric outer cable jacket has a thickness of 0.5 mm to 0.9 mm.

11. The optical cable of claim 10, wherein the plurality of optical fiber ribbons are unbuffered such that all of the plurality of optical fiber ribbons are not separated from each other within the outer cable jacket.

12. The optical cable of claim 10, wherein the interior cavity does not include a central strength member.

13. The optical cable of claim 10, wherein a number of the plurality of optical fiber ribbons is at least 12.

14. The optical cable of claim 10, wherein the non-gel, non-liquid water blocking material is at least one of a water blocking tape wrapped around all of the plurality of optical fiber ribbons and a water blocking powder.

* * * * *